United States Patent
Labrecque

(10) Patent No.: US 7,634,721 B1
(45) Date of Patent: Dec. 15, 2009

(54) COMPOSITE COMPONENT ARCHITECTURE USING JAVASERVER PAGES (JSP) TAGS

(75) Inventor: Dan A. Labrecque, Tyngsboro, MA (US)

(73) Assignee: Sun Microsystems Inc., Santa Clara, CA (US)

( * ) Notice: Subject to any disclaimer, the term of this patent is extended or adjusted under 35 U.S.C. 154(b) by 281 days.

(21) Appl. No.: 10/924,371

(22) Filed: Aug. 23, 2004

(51) Int. Cl.
*G06F 17/00* (2006.01)

(52) U.S. Cl. ..................... 715/234

(58) Field of Classification Search ............ 715/513, 715/501.1, 500, 201, 205, 234
See application file for complete search history.

(56) References Cited

U.S. PATENT DOCUMENTS

| | | | |
|---|---|---|---|
| 6,202,096 B1* | 3/2001 | Williams et al. | 709/230 |
| 6,823,522 B1* | 11/2004 | Lamb | 719/316 |
| 7,043,460 B2* | 5/2006 | Deboer et al. | 706/10 |
| 7,246,134 B1* | 7/2007 | Kitain et al. | 707/102 |
| 7,325,189 B2* | 1/2008 | Kurumai et al. | 715/234 |
| 2002/0184343 A1* | 12/2002 | Ashcroft et al. | 709/219 |
| 2003/0005411 A1* | 1/2003 | Gerken | 717/120 |
| 2003/0028364 A1* | 2/2003 | Chan et al. | 704/1 |
| 2003/0069906 A1* | 4/2003 | Cichowlas et al. | 707/501.1 |
| 2003/0078960 A1* | 4/2003 | Murren et al. | 709/203 |
| 2003/0115365 A1* | 6/2003 | Lindsey | 709/246 |
| 2003/0217332 A1* | 11/2003 | Smith et al. | 715/513 |
| 2003/0225829 A1* | 12/2003 | Pena et al. | 709/203 |
| 2004/0015578 A1* | 1/2004 | Karakashian et al. | 709/223 |
| 2004/0040012 A1* | 2/2004 | Barsness et al. | 717/123 |
| 2004/0073630 A1* | 4/2004 | Copeland et al. | 709/218 |
| 2004/0093595 A1* | 5/2004 | Bilange | 717/171 |
| 2004/0107250 A1* | 6/2004 | Marciano | 709/204 |
| 2004/0109024 A1* | 6/2004 | Hori et al. | 345/762 |
| 2004/0168124 A1* | 8/2004 | Beisiegel et al. | 715/513 |
| 2004/0172623 A1* | 9/2004 | Eckels et al. | 717/125 |
| 2004/0187077 A1* | 9/2004 | Bhogal et al. | 715/517 |
| 2004/0205557 A1* | 10/2004 | Bahrs et al. | 715/513 |
| 2004/0216042 A1* | 10/2004 | Consolatti et al. | 715/513 |
| 2004/0261017 A1* | 12/2004 | Perry | 715/513 |
| 2004/0268238 A1* | 12/2004 | Liu et al. | 715/513 |
| 2004/0268312 A1* | 12/2004 | Abe et al. | 717/124 |
| 2005/0015717 A1* | 1/2005 | Kirkpatrick et al. | 715/513 |
| 2005/0050454 A1* | 3/2005 | Jennery et al. | 715/513 |
| 2005/0097522 A1* | 5/2005 | Backhouse et al. | 717/136 |
| 2005/0125457 A1* | 6/2005 | Kang | 707/200 |
| 2005/0138650 A1* | 6/2005 | Hon et al. | 719/330 |
| 2005/0144226 A1* | 6/2005 | Purewal | 709/203 |
| 2005/0155027 A1* | 7/2005 | Wei | 717/162 |

(Continued)

OTHER PUBLICATIONS

Ping et al., Migration of Legacy Web Application to Enterprise JavaTM Environments—Net.Data to JSPTM Transformation, ACM 2003, pp. 1-15.*

(Continued)

*Primary Examiner*—Cong-Lac Huynh
(74) *Attorney, Agent, or Firm*—Brooks Kushman P.C.

(57) ABSTRACT

A method, apparatus and computer program product for a composite component includes a first JSP tag component and a second JSP tag component referenced by the first JSP tag component. The composite component utilizes a renderer in communication with one of the JSP tag components, the renderer providing a result in a predetermined format. A JSP buffer is in communication the renderer, and is used to store the result from the renderer.

20 Claims, 5 Drawing Sheets

U.S. PATENT DOCUMENTS

| | | | | |
|---|---|---|---|---|
| 2005/0160358 A1* | 7/2005 | Gumz et al. | | 715/513 |
| 2005/0268225 A1* | 12/2005 | Pelegri-Llopart et al. | ... | 715/513 |
| 2005/0283754 A1* | 12/2005 | Vignet | | 717/104 |
| 2005/0289156 A1* | 12/2005 | Maryka et al. | | 707/100 |
| 2006/0020908 A1* | 1/2006 | Jain et al. | | 717/101 |
| 2006/0075384 A1* | 4/2006 | Farn et al. | | 717/114 |
| 2006/0112372 A1* | 5/2006 | Wang et al. | | 717/116 |
| 2006/0117248 A1* | 6/2006 | Kurumai et al. | | 715/513 |
| 2006/0206856 A1* | 9/2006 | Breeden et al. | | 717/101 |
| 2006/0282501 A1* | 12/2006 | Bhogal et al. | | 709/203 |
| 2007/0074124 A1* | 3/2007 | Farn | | 715/760 |
| 2008/0235661 A1* | 9/2008 | Arpana et al. | | 717/116 |
| 2009/0006945 A1* | 1/2009 | Gumz et al. | | 715/234 |

OTHER PUBLICATIONS

Agrawal et al., Vinci : A Service-Oriented Architecture for Rapid Development of Web Applications, ACM 2001, pp. 355-365.*

Abiteboul et al., Dynamic XML Documents with Distribution and Replication, ACM 2003, pp. 527-538.*

Villard, Authoring Transformations by Direct Manipulation for Adaptable Multimedia Presentations, ACM 2001, pp. 125-134.*

Bellas et al., A Flexible Framework for Engineering "My" Portals, ACM 2004, pp. 234-243.*

Ross et al., A Composable Framework for Secure Multi-modal Access to Internet Services from the Post-PC Devices, ACM Oct. 2002, pp. 389-406.*

Gitzel et al., Implementation of a Model-Centric Web Application Framework with J2EE, ACM Jun. 2004, pp. 148-153.*

Chen et al., Pinpoint: Problem Determination in Large, Dynamic Internet Services, IEEE 2002, pp. 1-10.*

Qiu et al., Making SVG a Web Service i a Message-based MVC Architecture, Google Sep. 2004, pp. 1-11.*

* cited by examiner

AddRemoveTag — 60

```
public int doEndTag() throws JspException {
    try {
        if (fireBeginDisplayEvent()) {
            ContainerView parentContainer = getParentContainerView();
            String name = getName();
            View child = (parentContainer != null) ? parentContainer.getChild(name) : null;
            writeOutput(fireEndDisplayEvent(getHTMLString(getParent(), pageContext, child)));
        }
    } catch (CompleteRequestException e) { return SKIP_PAGE; }
    return EVAL_PAGE;
}
protected String getHTMLString(Tag parent, PageContext pageContext, View view) throws JspException {
    View child = view.getChild(AddRemove.AVAILABLE_LISTBOX);
    SelectableListTag tag = new SelectableListTag();
    tag.setID("SelectedListBox");
    tag.setStyleClass("Lst");
    tag.setSize("10");

NonSyncStringBuffer buffer = new NonSyncStringBuffer();
    buffer.append("<table><tr><td>");
    buffer.append(tag.getHTMLString(parent, pageContext, child));
    buffer.append("</td></tr></table>");

return buffer.toString();
}
```

SelectableListTag — 62

```
// When used as a composite component, this method is unused. Evoked only by the JSP framework
// when used as a tag.
public int doEndTag() throws JspException {
    try {
        if (fireBeginDisplayEvent()) {
            ContainerView parentContainer = getParentContainerView();
            String name = getName();
            View child = (parentContainer != null) ? parentContainer.getChild(name) : null;
        }writeOutput(fireEndDisplayEvent(getHTMLString(getParent(), pageContext, child)));

} catch (CompleteRequestException e) { return SKIP_PAGE; }
    return EVAL_PAGE;
}
protected String getHTMLString(Tag parent, PageContext pageContext, View view) throws JspException {
    View child = view.getChild(AddRemove.AVAILABLE_LISTBOX);
    SelectableListTag tag = new SelectableListTag();
    tag.setSize("10");

NonSyncStringBuffer buffer = new NonSyncStringBuffer();
    buffer.append("<select id=\"SelectedListBox\" class=\"Lst\")
        .append("id=\"" + getId() + "\"")
        .append("class=\"" + getStyleClass() + "\"")
        .append("size=\"" + getSize() + "\"")
        .append("");

return buffer.toString();
}
```

JSP buffer

```
<table><tr><td>
<select id="SelectedListBox" class="Lst" size="10">...</select>
</td></tr></table>
```
— 64

*Figure 1*     PRIOR ART

COMPOSITE COMPONENT ARCHITECTURE USING JAVASERVER PAGES (JSP) TAGS

BACKGROUND

A JavaServer Page (JSP) tag component (also referred to simply as a JSP tag) comprises a set of Java instructions that provide modular functionality that can be used by a JSP page. The use of JSP tags reduces the necessity to embed large amounts of Java code in a JSP page. A custom JSP tag library can be built of JSP tags providing related functions and provided to an end-user.

By using JSP tags it is not necessary to edit every JSP page when a change is desired. Instead, the JSP tag is changed and the change is manifested by all the JSP pages using the JSP tag.

The JSP tag architecture does not necessarily support tag reuse within another tag, however composite components can be built which include JSP tags within other JSP tags. The composite components enable the building of complex HTML elements. Reusing JSP tags within other JSP tags provides a common look and feel for other tags within the same library. When the look and feel needs to change, only one JSP tag has to change and all others (which use the tag) automatically benefit.

To use a JSP tag as a composite component, the logic which generates the HTML strings is pulled out of the doStartTag and/or doEndTag methods and placed in a public method that accepts required parameters to generate an HTML string. By creating this method, other tags are able to evoke this method and generate the same string as the tag itself, thereby making the JSP tag reusable within other JSP tags. Accordingly, JSP tags are modified by providing an externally invokable output rendering function that allows the JSP server engine to use the JSP tags, while also allowing a developer to create composite components that reference these JSP tags via calls to this added output function.

JavaServer Faces (JSF) is a server side user interface (UI) component framework for Java technology based Web applications. Using JSF, a client makes a request, the request goes across a network to a server, where the JSF adjacent framework builds up a user interface representation and renders back to the client in whatever markup language that is appropriate for the client. By way of JSF, a component developer can define the behavior of a component once, and provide multiple renderers, each of which defines a different way to render the component to the same or to different clients. Stated differently, when a page is rendered for a particular client type, whether the client type is an HTML browser running on a desktop or is a WML browser running on a wireless phone, a particular renderer is used for displaying the data maintained in a user interface components. Accordingly, the same user interface components can be used to display information on different client types using different protocols. The component associated with the tag selects the renderer to use. This is also true when using JATO which comprises an XML-based language that describes an XML to Java mapping that can convert XML to Java objects and back.

Referring now to FIG. 1, an example of the code used in a prior art composite component for JSF and JATO is shown. First, the doEndTag method of AddRemoveTag 60 is evoked. In this example all HTML generation code is located in the getHtmlString method, which allows tags to be used as composite components.). The getHtmlString method is evoked.

In this example, an HTML selectable list is also required. Instead of generating hard coded strings, an existing SelectableListTag tag class is used as a composite component to generate the HTML. A SelectableListTag tag is instantiated and attribute values are set. To obtain the required HTML, the getHTMLString method of SelectableListTag 62 is evoked. The result is not stored in the JSP buffer, but instead is stored in a local buffer (not shown). The stored strings are output to the JSP buffer 64 later on, after the getHTMLString method of AddRemoveTag returns it's result.

Adding results to a local buffer allows flexibility regarding when the result is appended to the output. This means that tags can be evoked in any order. In JSF, renderer output is written directly to the JSP buffer. This means that developers must be more selective about when to evoke a component renderer. Each JSF component renderer must be evoked in the order HTML is expected to be written to the JSP buffer.

SUMMARY

Conventional mechanisms such as those explained above suffer from a variety of problems or deficiencies. One such problem is that conventional JSP tag architecture does not necessarily support tag reuse. The JSP architecture is designed to evoke doStart/End methods when a tag is rendered on a JSP page that prevents a first tag from using a second tag since the results from the second tag are not made available to the first tag. For example, a component tag may require a hypertext reference (href) as part of the tag's HTML layout; however, this href string is hard coded within the tag code.

The methods within a JSP tag can be manipulated to evoke other tags and obtain the same functionality as if a developer used the same JSP tag directly on the page. A developer can thus write a utility class that contains reusable code. This is accomplished by modifying JSP tags to provide an externally invokable output rendering function that allows the JSP server engine to use such tags, and further allows a developer to create master components that reference these tags via calls to this added output function. However, this requires that each tag be modified to provide the required additional functionality in order to be used as part of a composite component. This is labor-intensive and, as he modified tags are larger, requires additional space and processing power.

Embodiments of the invention significantly overcome such deficiencies and provide mechanisms and techniques that provide a composite component architecture using JSP tags. The composite component relies on the ability of JavaServer Faces to render the output, thus creating smaller components classes that do not need to have rendering calls built-in to the tag library rendering functions, and avoids the need to modify the tag library functions from their original form (i.e., no need to separate out the rendering function of the tags). The rendering is now handled by Java Server Faces and the master components can still use the tags as building blocks for java server pages.

A composite component includes a first JSP tag component and a second JSP tag component that is referenced by the first JSP tag component. A renderer is in communication with the JSP tags, wherein an output from a JSP tag is provided to the renderer. The renderer provides the result in a predetermined format to a JSP buffer for use by the appropriate device or component.

In a particular embodiment, a method for providing a composite component includes providing a first JSP tag component and referencing a second JSP tag component by the first JSP tag component. The method further includes rendering an output from at least one of the JSP tag components into a predetermined format, and storing a result from the renderer in a JSP buffer.

Other embodiments include a computer readable medium having computer readable code thereon for providing a composite component. The medium comprises instructions for providing a first JSP tag component, and instructions for referencing a second JSP tag component by the first JSP tag component. The medium further includes instructions for rendering an output from at least one of the JSP tag components into a predetermined format, and instructions for storing a result from the renderer in a JSP buffer.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides a composite component as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing composite components as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Sun Microsystems, Inc. of Santa Clara, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 comprises a block diagram of a prior art composite component for JSP and JATO;

DETAILED DESCRIPTION

A composite component is made up of a JSP tag that includes a reference to another JSP tag. The component associated with the tag selects the renderer to use or there can be different versions of the component, one version for each renderer.

A renderer is evoked for rendering a result from a JSP tag of the composite component into a particular format. The output from the renderer is stored in a JSP buffer. The rendering is done using JavaServer Faces; therefore no modification is required to any existing JSP tags. The component associated with the tag selects the renderer to use. The library of renderers is referred to as a render kit.

The rendering model defines the presentation aspects of a UI component. The same component can be rendered in different ways by using different renderers. The same component can be rendered to an HTML client (i.e. a web browser) using an HTML renderer or to a WML client (i.e. a cell phone) by using to a WML renderer.

Figure 2:
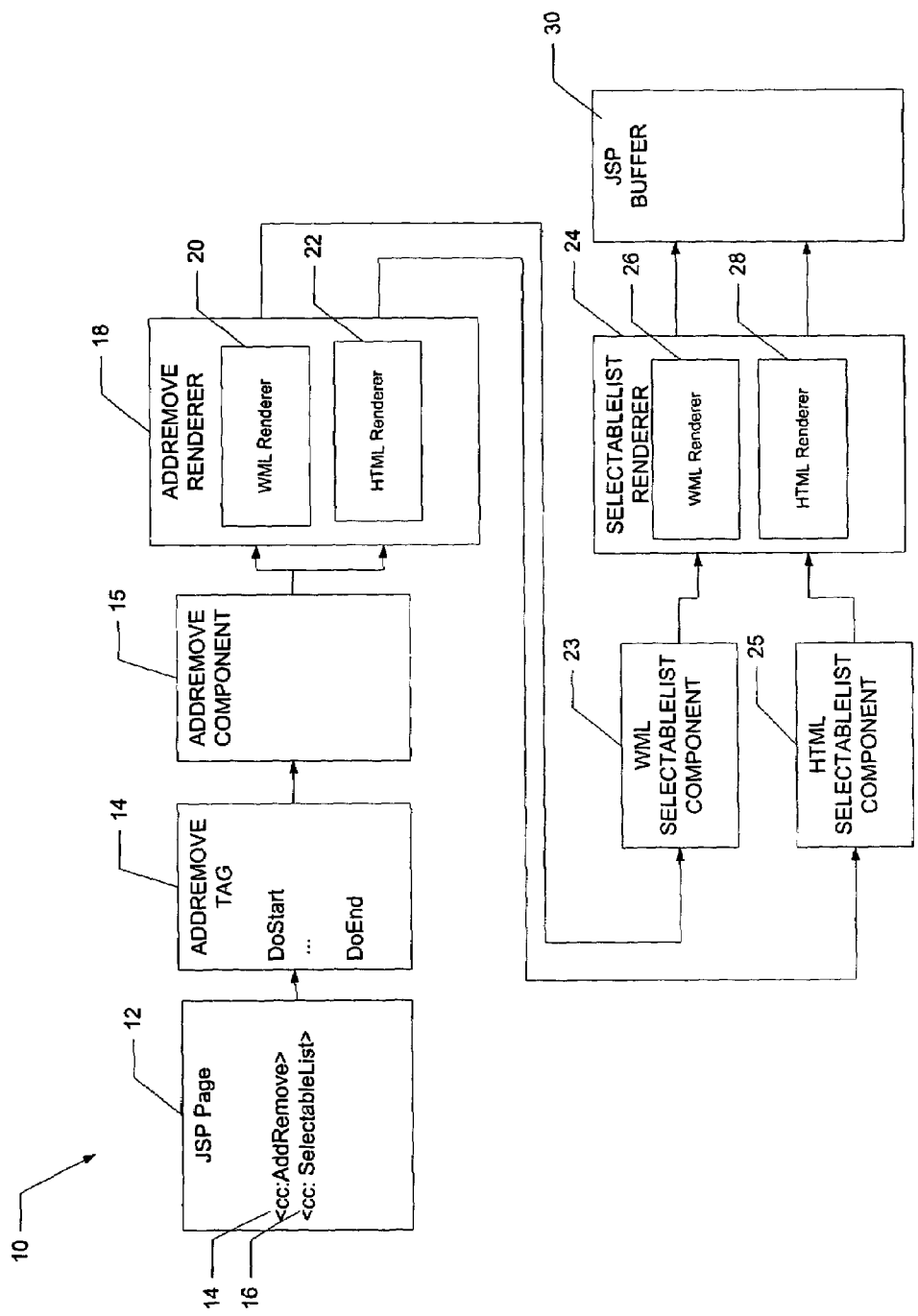
FIG. 2 comprises a block diagram of a composite component environment.

Referring now to FIG. 2 a block diagram of a particular embodiment of a composite component environment 10 is shown. A JSP page 12 includes a first JSP tag 14 labeled AddRemove that references a second JSP tag component 16 labeled SelectableList. While only a few components are shown and described, it should be appreciated that a composite component can include any number of JSP tag components. The AddRemove tag 14 includes a DoStart method and a DoEnd method. Other methods and/or code are executed between execution of the DoStart method and the DoEnd method. This code includes a reference to the SelectableList JSP tag 16. Either of the JSP tags 14 and 16 may be associated with a renderer for rendering output from the tag.

The AddRemove tag evokes the ADDREMOVE component 15, which in turn is in communication with an AddRemove renderer 18. The AddRemove renderer in this example includes two renderers, a Wireless Markup Language (WML) renderer 20 and a Hypertext Markup Language (HTML) renderer 22. The appropriate renderer is determined by the ADDREMOVE component 15. While only two renderers are shown and described, it should be appreciated that any number of renderers could be used. The appropriate renderer is determined for rendering the results from the AddRemove component 15. The results from the AddRemove renderer are provided to JSP buffer 30.

The renderer class associated with the AddRemove tag 14 evokes the SelectableListComponent. The SelectableList tag 16 also has an associated selectable list component, in this example a WML SELECTABLE LIST Component 23 and also an HTML SELECTABLELIST component 25. The SelectableList renderer 24 also includes a WML renderer 26 and an HTML renderer 28. Again, while only two components and associated renderers are shown and described, it should be appreciated that any number of components and associated renderers could be used. The appropriate renderer is determined for rendering the results from the SelectableList tag 16. The results from the SelectableList renderer 24 are provided to JSP buffer 30. In such a manner the results of the individual JSP tags are made available to other tags, such that a tag can reference another tag, thereby providing composite components comprised of multiple tags that can be used to build applications. In a particular embodiment the composite component is used to provide a User Interface (UI) in the proper format for the particular user device. As shown and described above, a component (e.g., ADDREMOVE component 15) can determine which renderer type to use, or alternately there can be a separate component for each renderer type (e.g. WML SELECTABLELIST component 23 and HTML SELECTABLELIST component 25).

Figure 3:
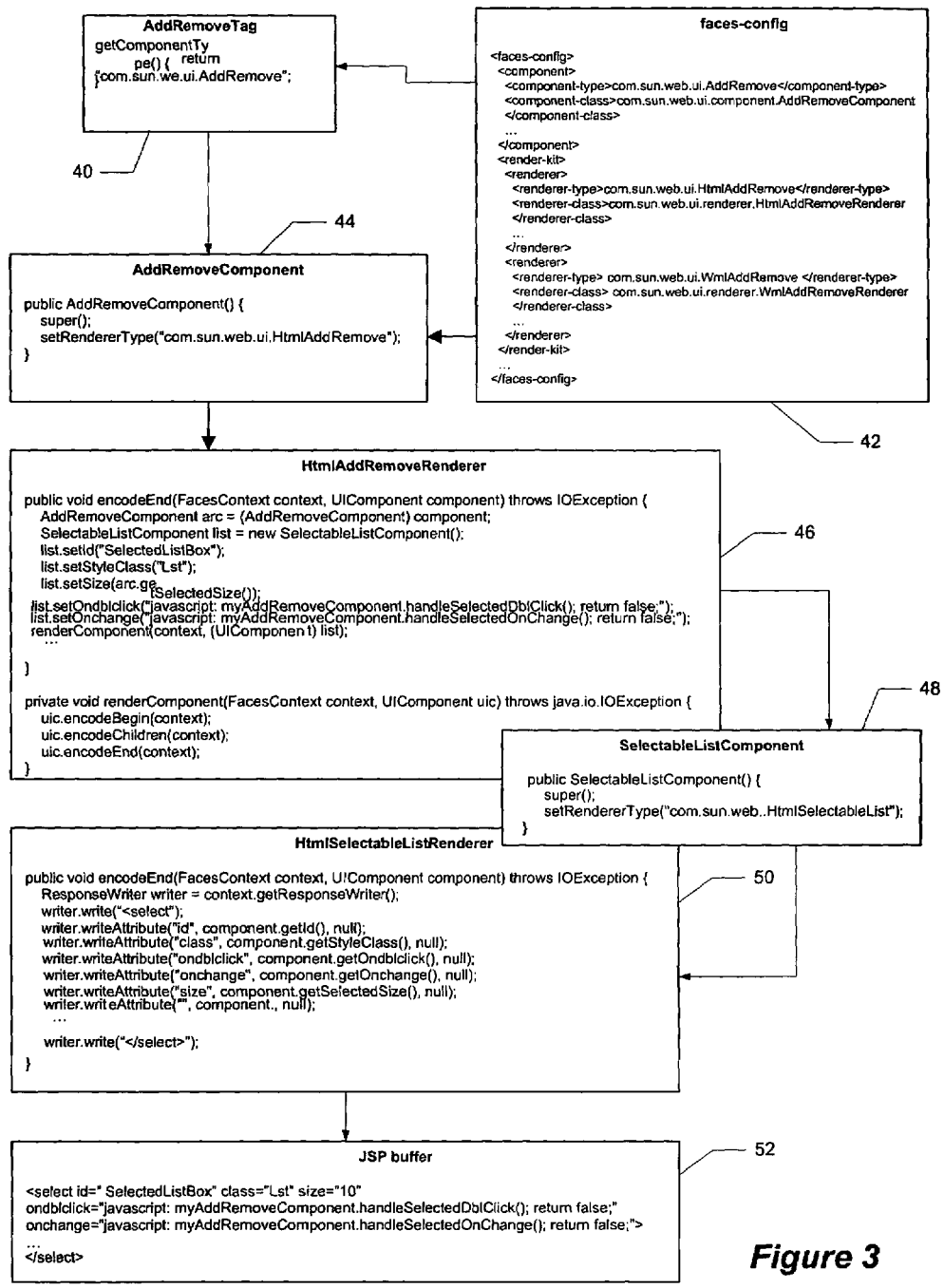
FIG. 3 comprises a block diagram of a composite component for JSP and JSF.

An example of the code used in a composite component for JSP and JSF is shown in FIG. 3. In this example, the JSP tag AddRemove references the JSP tag SelectedList both of which are rendered to provide the desired output in the desired format.

The AddRemoveTag tag 40 is evoked to obtain the component type. JSF uses this string as a key to look up the component class in a file 42, named faces-config. The JSF framework evokes the AddRemoveComponent component 44 to determine which renderer to use. For this example, an HTML renderer is used. JSF uses this string as a key to look up the renderer class in faces-config 42. JSF evokes the encodeEnd method of HtmlAddRemoveRenderer renderer 46.

In this example, the HtmlAddRemoveRenderer renderer 46 requires an HTML selectable list. Instead of generating hard coded strings, an existing tag renderer is used as a composite component to generate the HTML. To evoke the proper tag renderer, the code instantiates a SelectableListComponent component 48. After all attribute values have been set, the encodeBegin, encodeChildren, and encodeEnd methods are evoked for the SelectableListComponent component 48.

Now that the SelectableListComponent component 48 has been evoked, the JSF framework runs through a similar cycle again for this component 48. That is, JSF obtains the renderer type from the component 48, performs a look up in faces-config, and evokes the proper renderer 50. The renderer 50 outputs HTML strings directly into the JSP buffer 52, which has the same affect as if the tag was used directly on a JSP page.

The composite component renderer classes are evoked by the JSF framework. This renderer class can then evoke other renderers as micro-components to build something more complex. Each time a renderer is evoked, the generated output is written to a JSP buffer.

Another embodiment includes modifying the renderer classes similar to the JSP tag. For example, instead of evoking the encodeBegin, encodeChildren, and encodeEnd methods of the component class, a getHtmlString method is created in the renderer. This allows the result to be returned to the calling class, which is stored in a local buffer instead of directly outputting strings to the JSP buffer.

Figure 4:
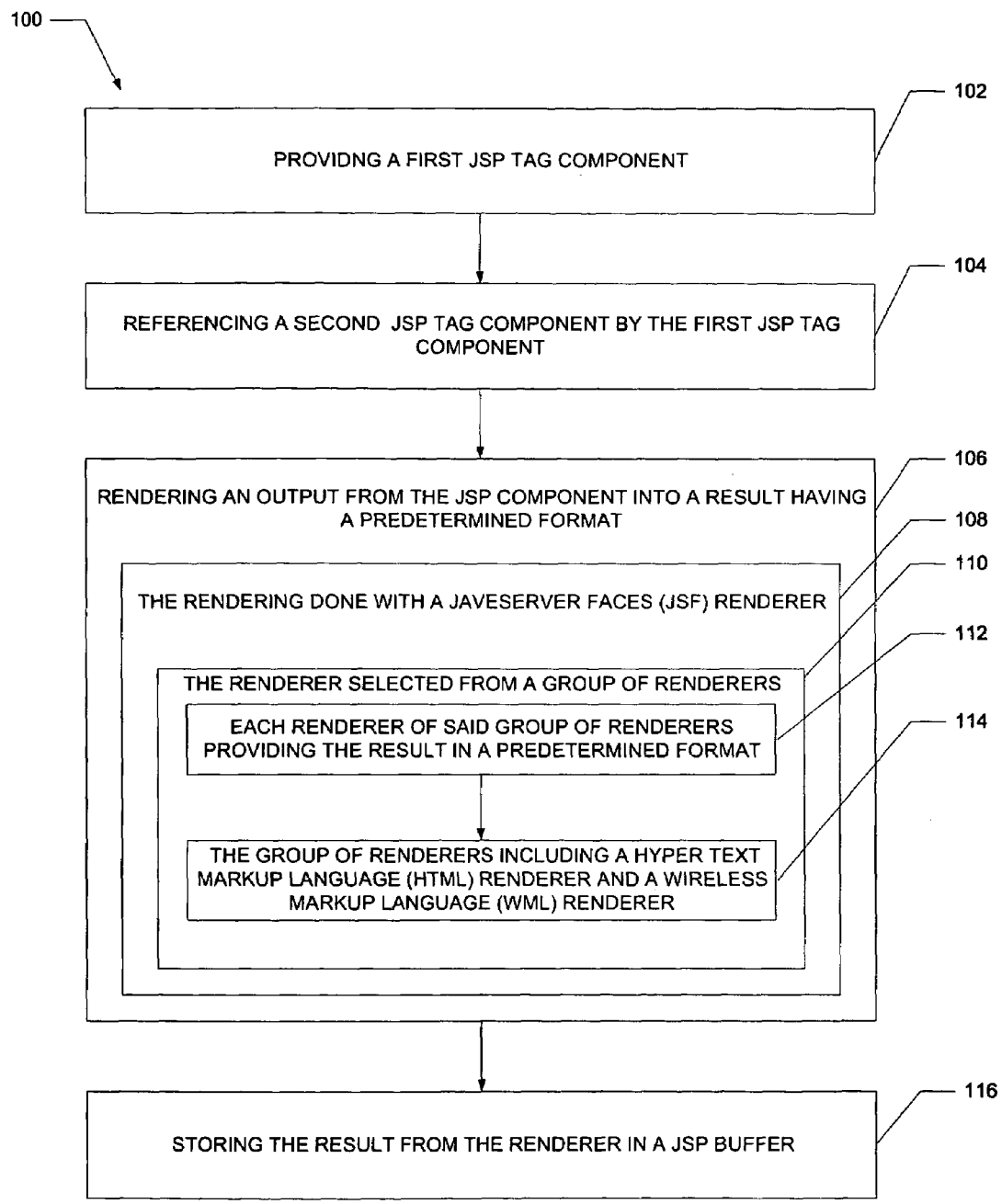
FIG. 4 comprises a flow diagram of a method for providing composite components.

A flow chart of the presently disclosed method is depicted in FIG. 4. The rectangular elements are herein denoted "processing blocks" and represent computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4 the method for providing a composite component begins with processing block 102 that states providing a first JSP tag component. This first JSP tag component is part of the composite component and will reference other JSP tag components. The JSP tag component comprises a set of Java instructions that provide modular functionality that can be used by a JSP page. The use of JSP tags reduces the necessity to embed large amounts of Java code in a JSP page.

Processing block 104 discloses referencing a second JSP tag component by the first JSP tag component. The first component will reference the second component, thus the composite component can use multiple JSP tags.

Processing block 106 recites rendering a result from at least one of the first JSP tag component and the second JSP tag component into a result having a predetermined format. Processing block 108 states the rendering is done with a JavaServer Faces (JSF) renderer. This use of a renderer precludes the use of a getHTMLstring within the JSP tag. The rendering model defines the presentation aspects of a component.

Processing block 110 discloses the renderer is selected from a group of renderers, and processing block 112 discloses that each renderer of the group of renderers provides the result in a predetermined format. The same component can be rendered in different ways by using different renderers. The same component can be rendered to an HTML client (i.e. a web browser) using an HTML renderer or to a WML client (i.e. a cell phone) by using to a WML renderer. Accordingly, the same component can be used to provide output to different renderers, with the renderers providing a result in a predetermined format.

Processing block 114 recites the group of renderers include a Hyper Text Markup Language (HTML) renderer and a Wireless Markup Language (WML) renderer. The HTML renderer is used for providing an output for a web browser, and the WML renderer is used for the same component to provide output for a device such as a cell phone.

Processing block 116 discloses storing an output from the renderer in a JSP buffer. The contents of the JSP buffer are made available to other components or applications. By way of the above-described method, composite components are provided which enable the building of complex HTML elements. Reusing JSP tags within other JSP tags provides a common look and feel for other tags within the same library. When the look and feel needs to change, only one JSP tag has to change and all other JSP tags or composite components (which use the tag) automatically benefit.

Figure 5:
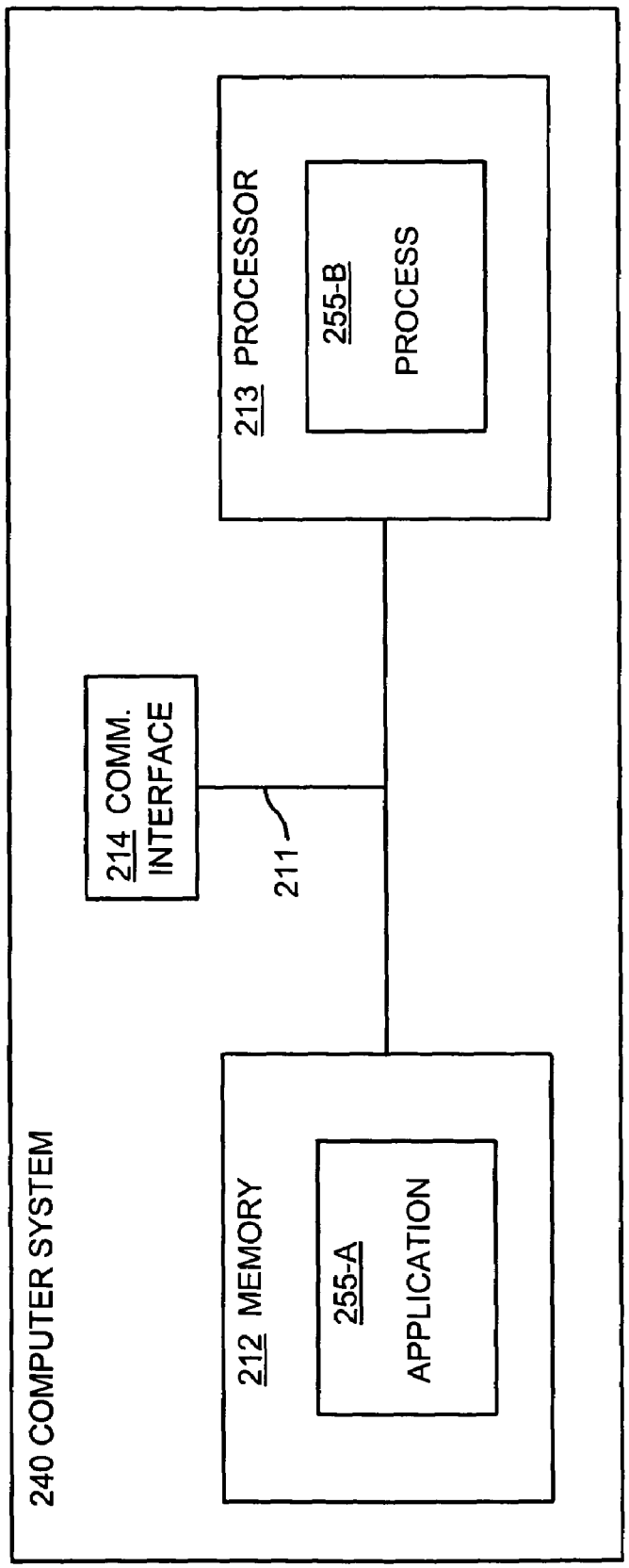
FIG. 5 illustrates an example computer system architecture for a host computer system that utilizes composite components in accordance with embodiments of the invention.

Referring now to FIG. 5, an example architecture of a computer system that is configured as a host computer system 240 is shown. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding agent process 255-B. In other words, the agent process 255-B represents one or more portions of the agent application 255-A performing within or upon the processor 213 in the computer system. It is to be understood that the agent 255 operate as explained in former examples are represented in FIG. 3 by the agent application 255-A and/or the process 255-B.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of providing a composite component comprising:
   providing a first JavaServer Pages (JSP) tag component invoked by a first JSP tag;
   providing a second JSP tag component related to a second JSP tag;
   rendering output from said first JSP tag component with a first JavaServer Faces (JSF) renderer into a first result having a predetermined format and rendering output from said second JSP tag component with a second JavaServer Faces (JSF) renderer into a second result having the predetermined format, said second JSF renderer referenced from within said first JSF renderer, which includes:
      after said rendering output from the first JSP tag component with the first JavaServer Faces (JSF) renderer into the first result having the predetermined format:
      via the first JSF renderer, invoking the second JSF renderer to initiate creating the output of the second JSF renderer; and
   storing the first and second results from said rendering in a JSP buffer.

2. The method of claim 1 wherein each of the first and second JavaServer Faces (JSF) renderer is selected from a group of renderers, each renderer of said group of renderers providing the results in a particular format.

3. The method of claim 2 wherein said rendering is done with a renderer selected from a group of renderers, said group of renderers including a Hyper Text Markup Language (HTML) renderer and a Wireless Markup Language (WML) renderer.

4. The method of claim 1 wherein said first JSP tag component, said second JSP tag component, said first and second JavaServer Faces (JSF) renderers and said JSP buffer provide a component for a User Interface.

5. The method of claim 1 further comprising at least one other renderer and wherein a choice regarding which renderer to use is determined by one of said first JSP tag component and said second JSP tag component.

6. The method as in claim 1, wherein said providing a second JSP tag component related to a second JSP tag includes:
   providing a reference to the second JSP tag within code of the first JSP tag, the code comprising at least one method of the first JSP tag.

7. A method of providing a composite component comprising:
   providing a first JavaServer Pages (JSP) tag component invoked by a first JSP tag;
   providing a second JSP tag component related to a second JSP tag;
   rendering output from said first JSP tag component with a first JavaServer Faces (JSF) renderer into a result having a predetermined format and rendering output from said second JSP tag component with a second JavaServer Faces (JSF) renderer into a second result having the predetermined format, said second JSF renderer referenced from within said first JSF renderer, said first and second JavaServer Faces (JSF) renderers each selected from a group of renderers, each renderer of said group of renderers providing an output in a particular format, said group of renderers include a Hyper Text Markup Language (HTML) renderer and a Wireless Markup Language (WML) renderer, which includes:
      after said rendering output from the first JSP tag component with the first JavaServer Faces (JSF) renderer into the first result having the predetermined format:
      via the first JSF renderer, invoking the second JSF renderer to initiate creating the output of the second JSF renderer; and
   storing said first and second results in a JSP buffer wherein said first JSP tag component, said second JSP tag component, said first and second JavaServer Faces (JSF) renderers and said JSP buffer provide a component for a User Interface.

8. A computer readable medium having computer readable code thereon for providing a composite component, the medium comprising:

instructions for providing a first JavaServer Pages (JSP) tag component invoked by a first JSP tag;

instructions for providing a second JSP tag component related to a second JSP tag;

instructions for rendering output from said first JSP tag component at a first renderer to provide a first result having a predetermined format and rendering output from said second JSP tag component at a second renderer to provide a second result in the predetermined format, said second renderer referenced from within said first renderer, which includes:

instructions for invoking the second renderer via the first renderer in order to initiate creating the output of the second renderer after rendering output from said first JSP tag component at the first JSF renderer; and instructions for storing the first and second results from said first and second renderers in a JSP buffer.

9. The computer readable medium of claim 8 wherein said instructions for rendering comprise instructions for rendering with a first and second JavaServer Faces (JSF) renderer.

10. The computer readable medium method of claim 8 wherein said instructions for rendering for each of the first and second renderers comprise instructions for rendering with a renderer selected from a group of renderers, each renderer of said group of renderers providing the result in a particular format.

11. The computer readable medium method of claim 10 wherein said instructions for rendering comprise instructions for rendering with a renderer selected from a group of renderers, said group of renderers including a Hyper Text Markup Language (HTML) renderer and a Wireless Markup Language (WML) renderer.

12. The computer readable medium method of claim 8 wherein said first JSP tag component, said second JSP tag component, said first and second renderers and said JSP buffer provide a component for a User Interface.

13. The computer readable medium of claim 8 further comprising instructions wherein at least one other renderer is used and wherein a choice regarding which renderer to use is determined by one of said first JSP tag component and said second JSP tag component.

14. A computer readable medium having computer readable code thereon for providing a composite component, the medium comprising:

instructions for providing a first JavaServer Pages (JSP) tag component invoked by a first JSP tag;

instructions for providing a second JSP tag component related to a second JSP tag;

instructions for rendering, at a first JavaServer Faces (JSF) renderer, output from said first JSP tag component and rendering, at a second JavaServer Faces (JSF) renderer, output from said second JSP tag component, said second JSF renderer referenced from within said first JSF renderer, said first and second JavaServer Faces (JSF) renderers each selected from a group of renderers, each renderer of said group of renderers providing a result in a particular format, said group of renderers include a Hyper Text Markup Language (HTML) renderer and a Wireless Markup Language (WML) renderer, which includes:

instructions for invoking the second JSF renderer via the first JSF renderer in order to initiate creating the output of the second JSF renderer after rendering output from said first JSP tag component at the first JSF renderer; and instructions for storing results from said first and second JavaServer Faces renderers in a JSP buffer and wherein said first JSP tag component, said second JSP tag component, said first and second JavaServer Faces renderers and said JSP buffer provide a component for a User Interface, the JSP buffer in communication with the first and second JavaServer Faces renderers.

15. A computer system comprising:

a memory;

a processor;

a communications interface;

an interconnection mechanism coupling the memory, the processor and the communications interface; and wherein the memory is encoded with an application that when performed on the processor, provides a process for processing information, the process causing the computer system to perform the operations of:

providing a first JavaServer Pages (JSP) tag component invoked by a first JSP tag;

providing a second JSP tag component related to a second JSP tag, said second JSP tag referenced from within said first JSP tag;

rendering output from said first JSP tag component at a first renderer into a result having a predetermined format and rendering output from said second JSP tag component at a second renderer into a second result having the predetermined format, which includes:

invoking the second renderer via the first renderer in order to initiate creating the output of the second renderer after rendering output from said first JSP tag component at the first renderer; and storing the first and second results from said first and second renderers in a JSP buffer.

16. The computer system of claim 15 wherein said rendering is done with a first and a second JavaServer Faces (JSF) renderer.

17. The computer system of claim 16 wherein said rendering is done with each of the first and the second JavaServer Faces (JSF) renderers selected from a group of renderers, said group of renderers including a Hyper Text Markup Language (HTML) renderer and a Wireless Markup Language (WML) renderer.

18. The computer system of claim 16 wherein said first JSP tag component, said second JSP tag component, said first and the second renderers and said JSP buffer provide a component for a User Interface.

19. The computer system of claim 15 wherein said rendering is done with each of the first and a second renderers selected from a group of renderers, each renderer of said group of renderers providing the results in a particular format.

20. A computer system comprising:

a memory;

a processor;

a communications interface;

an interconnection mechanism coupling the memory, the processor and the communications interface; and wherein the memory is encoded with an application that when performed on the processor, provides a process for processing information, the process causing the computer system to perform the operations of:

providing a first JavaServer Pages (JSP) tag component invoked by a first JSP tag;

providing a second JSP tag component related to a second JSP tag;

rendering, at a first JavaServer Faces (JSF) renderer, output from said first JSP tag component and rendering, at a second JavaServer Faces (JSF) renderer, output from said second JSP tag component, said second JSF renderer referenced from within said first JSF renderer, said first and second JavaServer Faces (JSF) renderers each selected from a group of renderers, each renderer of said group of renderers providing a result in a predetermined format, said group of renderers include a Hyper Text Markup Language (HTML) renderer and a Wireless Markup Language (WML) renderer, which includes:

invoking the second JSF renderer via the first JSF renderer in order to initiate creating the output of the second JSF renderer after rendering output from said first JSP tag component at the first JSF renderer; and storing said first and second results in a JSP buffer wherein said first JSP tag component, said second JSP tag component, said first and second JavaServer Faces renderers and said JSP buffer provide a component for a User Interface.

* * * * *

UNITED STATES PATENT AND TRADEMARK OFFICE
CERTIFICATE OF CORRECTION

PATENT NO. : 7,634,721 B1  Page 1 of 1
APPLICATION NO. : 10/924371
DATED : December 15, 2009
INVENTOR(S) : Dan A. Labrecque It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 299 days.

Signed and Sealed this

Twenty-first Day of December, 2010

David J. Kappos
*Director of the United States Patent and Trademark Office*